United States Patent
Chow

(10) Patent No.: US 9,182,183 B2
(45) Date of Patent: Nov. 10, 2015

(54) CLEANING SYSTEM

(75) Inventor: Kok Heng Alex Chow, Singapore (SG)

(73) Assignee: HVS ENGINEERING PTE LTD, Singapore (SG)

( * ) Notice: Subject to any disclaimer, the term of this patent is extended or adjusted under 35 U.S.C. 154(b) by 407 days.

(21) Appl. No.: 13/876,789

(22) PCT Filed: Oct. 1, 2010

(86) PCT No.: PCT/SG2010/000374
§ 371 (c)(1),
(2), (4) Date: Apr. 30, 2013

(87) PCT Pub. No.: WO2012/044249
PCT Pub. Date: Apr. 5, 2012

(65) Prior Publication Data
US 2013/0219638 A1    Aug. 29, 2013

(51) Int. Cl.
| F28G 1/12 | (2006.01) |
| B08B 9/055 | (2006.01) |
| B08B 9/057 | (2006.01) |
| F16L 55/46 | (2006.01) |
| F28G 9/00 | (2006.01) |
| F28G 15/00 | (2006.01) |

(52) U.S. Cl.
CPC . *F28G 1/12* (2013.01); *B08B 9/055* (2013.01); *B08B 9/057* (2013.01); *F16L 55/46* (2013.01); *F28G 9/00* (2013.01); *F28G 15/00* (2013.01)

(58) Field of Classification Search
CPC ...... B08B 9/055; B08B 9/0553; B08B 9/057; F16L 55/46; F28G 1/12; F28G 1/163; F28G 9/00; F28G 15/00
See application file for complete search history.

(56) References Cited

U.S. PATENT DOCUMENTS

| 4,569,097 A * | 2/1986 | Echols | 15/104.061 |
| 5,447,193 A * | 9/1995 | Peery | 165/95 |
| 7,735,545 B2 * | 6/2010 | Chow | 165/95 |

FOREIGN PATENT DOCUMENTS

| CN | 1169341 A | 1/1998 |
| EP | 0220347 A1 | 5/1987 |
| JP | 1990115696 A | 4/1999 |
| JP | 2002-081893 A | 3/2002 |
| JP | 2002081893 A | 3/2002 |
| JP | 2005528580 A | 9/2005 |
| JP | 2006084130 A | 3/2006 |
| JP | 2008502871 A | 1/2008 |
| JP | 3151221 U | 5/2009 |
| KR | 10-2003-0064354 A | 7/2003 |
| KR | 10-2003-0064364 A | 7/2003 |

* cited by examiner

*Primary Examiner* — Robert Scruggs
(74) *Attorney, Agent, or Firm* — patenttm.us

(57) ABSTRACT

Fluid is circulated through a heat exchange system for heat exchange to occur at a bundle of tubes making up a portion of the heat exchange system. Heat exchange efficiency at the bundle of tubes requires debris and fouling deposits accumulated therewithin to be substantially removed. Taking the heat exchange system off-line for physical flushing is not only ineffective but also disallow use of the heat exchange system for the duration it remains off-line. Described herein is an embodiment of a cleaning system which uses a displacement system for displacing cleaning balls carried in fluid into the bundle of tubes for cleaning thereof. A flow diverting system is configured and operable for introducing the cleaning balls to the bundle of tubes when in a first operating mode and for retrieving the cleaning balls from the plurality of tubes when in a second operating mode.

13 Claims, 5 Drawing Sheets

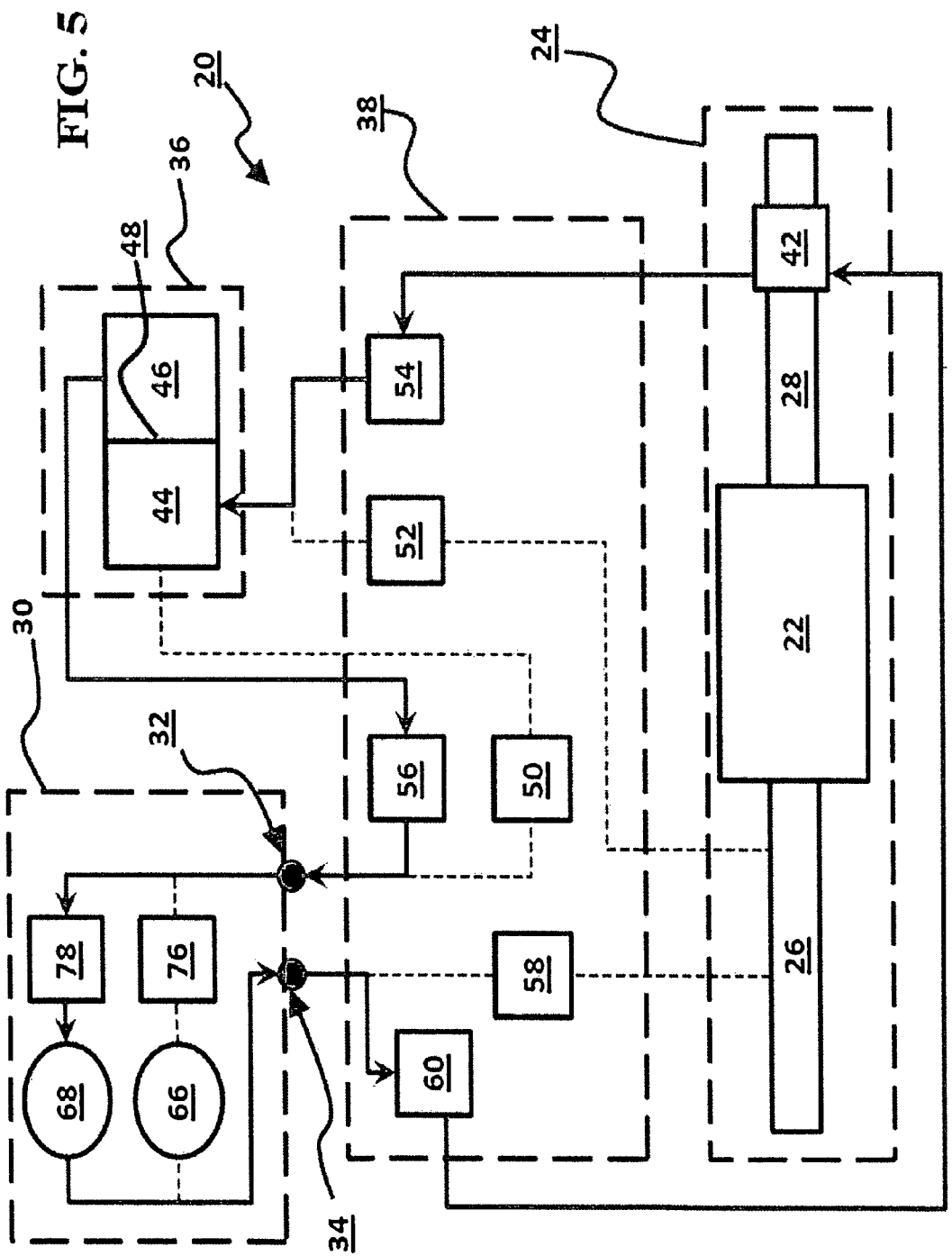

CLEANING SYSTEM

FIELD OF INVENTION

The present invention relates generally to a cleaning system for use with heat exchangers for cleaning thereof.

BACKGROUND

Heat exchange systems are used in various industries for a myriad of applications. Common applications of the heat exchange systems include heating ventilation and air-conditioning (HVAC) installations. In such installations, fluid is circulated through the heat exchange system for heat exchange to occur at a bundle of tubes making up a portion of the heat exchange system. Heat exchange efficiency at the bundle of tubes requires debris and fouling deposits accumulated therewithin to be substantially removed. Taking the heat exchange system off-line for physical flushing is not only ineffective but also disallow use of the heat exchange system for the duration it remains off-line.

Cleaning systems for use in conjunction with the heat exchange systems uses elastomeric balls transported by fluid to be fed and circulated in the heat exchange system. When the elastomeric balls passage through the bundle of tubes during circulation in the heat exchange system, any debris or fouling deposits in the bundle of tubes are pushed out. The elastomeric balls are then subsequently retrieved by the cleaning system.

However, it is known in the art that such cleaning systems utilises complex mechanisms for introducing the elastomeric balls into the heat exchange system and for the subsequent retrieval of the elastomeric balls therefrom. The complex mechanisms require frequent maintenance and proper coordination between mechanisms during use. Additionally, the configurations of existent cleaning systems known in the art are complicated and require extensive modifications to the heat exchange system in order for the cleaning system to be incorporated for use with the corresponding heat exchange system.

Therefore, there is an apparent need for an improved cleaning system for addressing the foregoing problems.

SUMMARY

In accordance with an aspect of the invention, there is disclosed a cleaning system for use with a plurality of tubes of a heat exchange system. The heat exchange system has an intake and an exhaust and comprises a displacement system, a manifold and a flow diverting system. The displacement system has a first port and a second port with the displacement system being operable for drawing liquid into the second port and expelling the drawn liquid out of the first port when in a first operating mode and drawing liquid into the first port and expelling the drawn liquid out of the second port when in a second operating mode. The manifold defines a first chamber and a second chamber with the manifold comprising a separator disposed between the first chamber and the second chamber. The first chamber is for receiving at least one cleaning ball. The separator defines at least one aperture for fluid communicating the first chamber with the second chamber and is shaped and dimensioned for substantially impeding passage of the at least one cleaning ball therethrough. The flow diverting system is adapted for fluid communicating the first port of the displacement system and the intake to the first chamber of the manifold and substantially impeding fluid communication of the first port and the exhaust with the second chamber and first chamber respectively when in the first operating mode. The flow diverting system is further adapted for fluid communicating the first port and the exhaust to the second chamber and first chamber respectively and substantially impeding fluid communication of each of the first port of the displacement system and the intake with the first chamber of the manifold when in the second operating mode. The at least one cleaning ball is displaced from the first chamber to the intake of the cleaning system for passage through the plurality of tubes when in the first operating mode and the at least one cleaning ball being drawn from the exhaust of the cleaning system into the first chamber when in the second operating mode. The at least one cleaning ball passages through the plurality of tubes for cleaning thereof.

BRIEF DESCRIPTION OF THE DRAWINGS

FIG. 5 shows a system flow diagram of the cleaning system of FIG. 1 in a multi-pump configuration and operating in a second operating mode.

DETAILED DESCRIPTION

Figure 1:
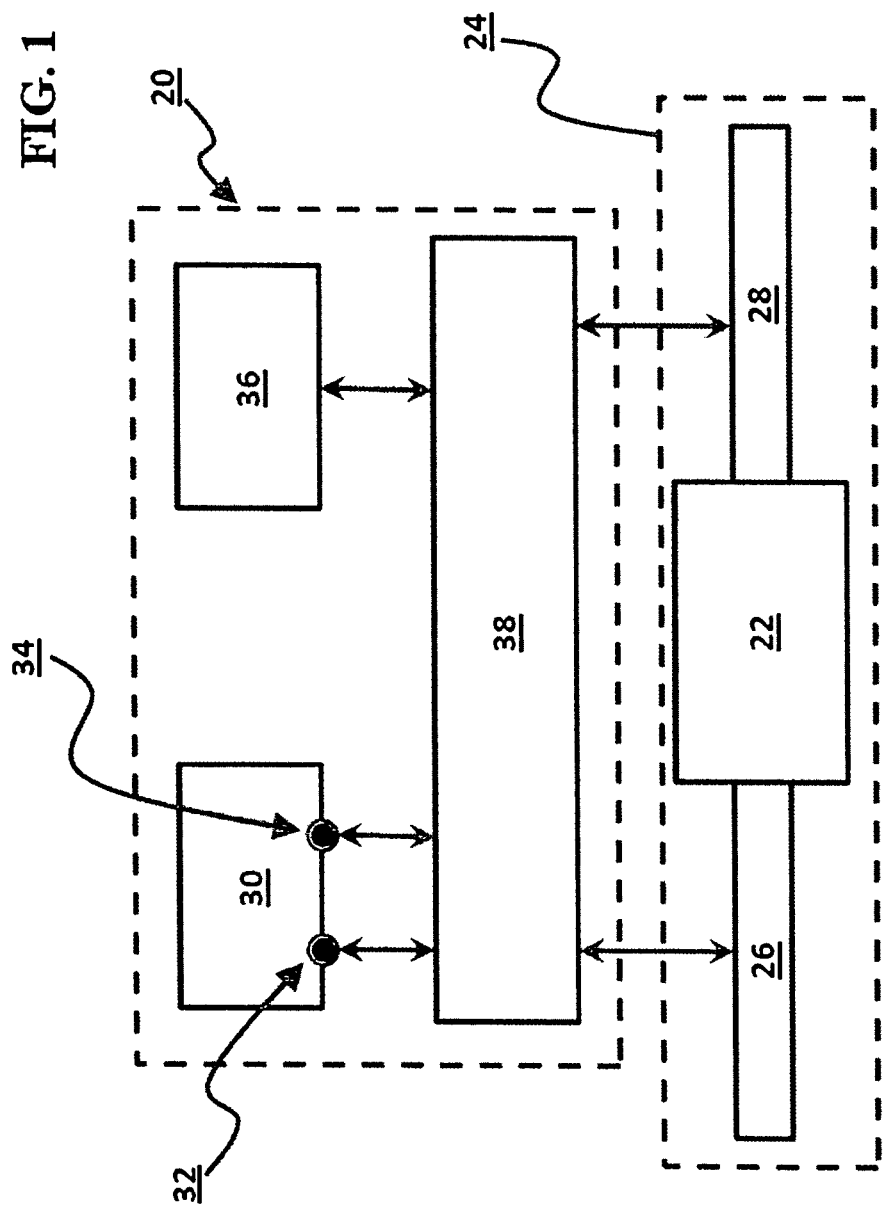
FIG. 1 shows a system flow diagram of a cleaning system coupled to a heat exchange system according to an embodiment of the invention.
Figure 2:
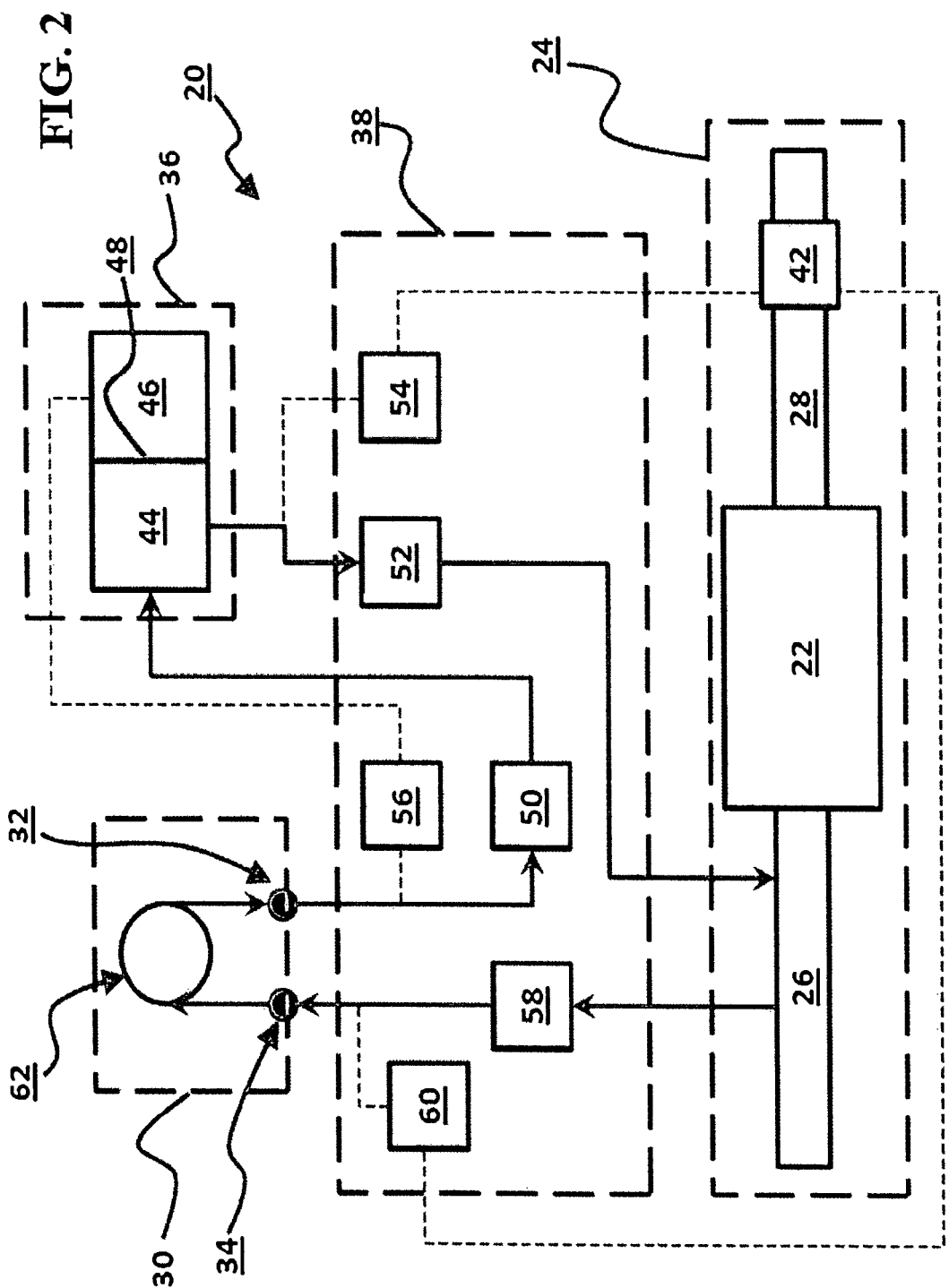
FIG. 2 shows a system flow diagram of the cleaning system of FIG. 1 in a single pump configuration and operating in a first operating mode.
Figure 3:
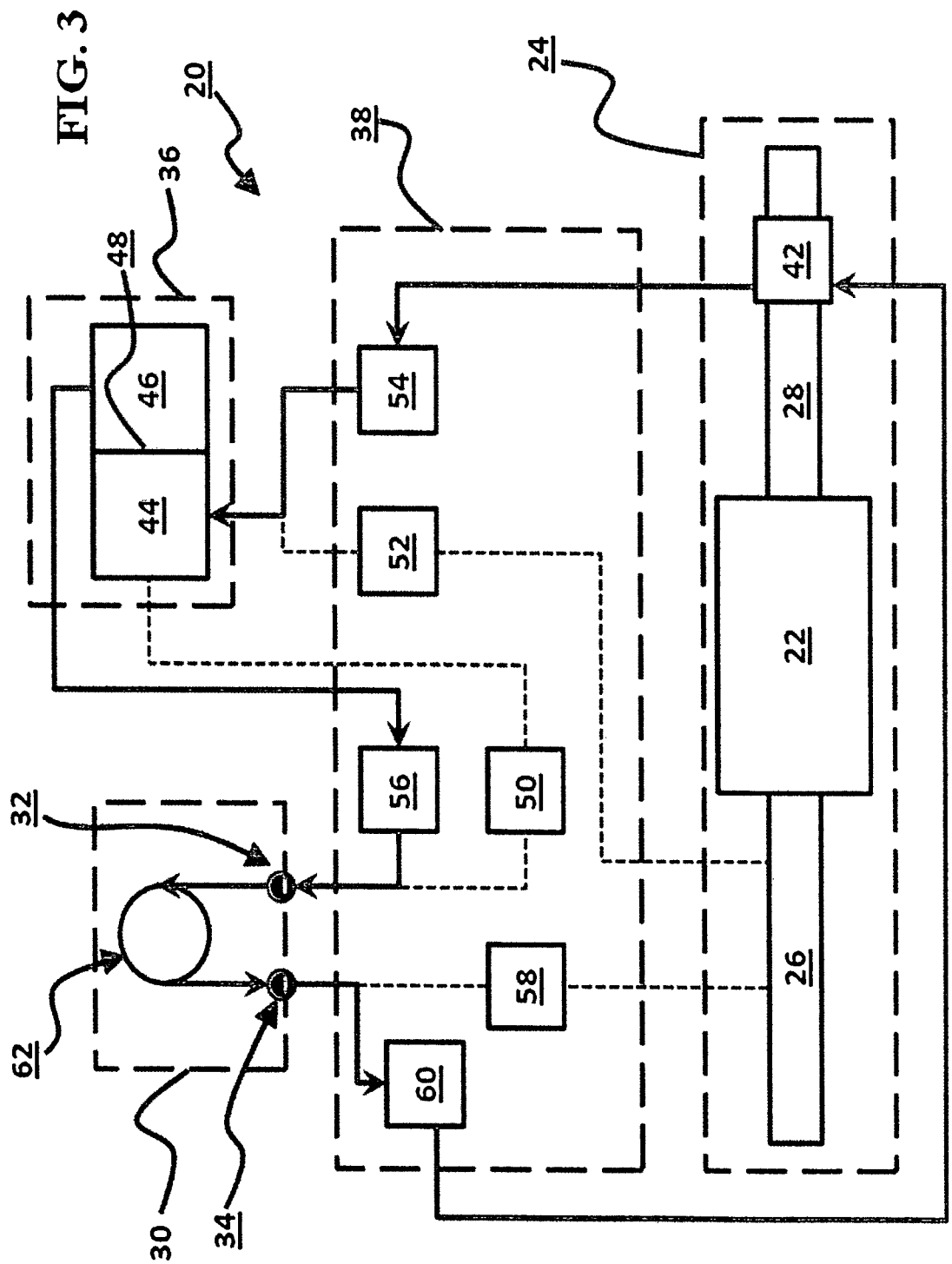
FIG. 3 shows a system flow diagram of the cleaning system of FIG. 1 in a single pump configuration and operating in a second operating mode.

Reference will now be made in detail to an exemplary embodiment of the present invention, examples, of which are illustrated in the accompanying drawings. While the invention will be described in conjunction with the embodiment, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention For purposes of brevity and clarity, descriptions of embodiments of the present invention are limited hereinafter to cleaning systems for use with heat exchange systems. This however does not preclude embodiments of the invention where fundamental principals prevalent among the various embodiments of the invention such as operational, functional or performance characteristics are required.

An exemplary embodiment of the invention, a cleaning system 20, is described with reference to FIGS. 1 to 5. The cleaning system 20 is preferably used for cleaning a plurality of tubes 22 of a heat exchange system 24. The plurality of tubes 22 is, for example, an evaporator or a condenser of heating, ventilation and air-conditioning (HVAC) systems or the like-heat-exchange systems. For such heat exchange systems, heat transfer occurs, at one or more segments containing the plurality of tubes 22. Theses plurality of tubes 22 are typically clustered as a module with an intake 26 wherethrough liquid is introduced, and an exhaust 28 wherefrom liquid passaging through the plurality of tubes 22 are subsequently discharged.

Preferably, a displacement pump (not shown) for circulating liquid, including when in the gaseous state, through the heat exchange system 24, specifically through the plurality of tubes 22. The cleaning system 20 is used in conjunction with the heat exchange system 24 by being integrated therewith fixably as an integrated component of the heat exchange system 24 or detachably to enable detachment of the cleaning system 20 from the heat exchange system 24 when not in use.

The cleaning system 20 comprises a displacement system 30 having a first port 32 and a second port 34, a manifold 36 and a flow diverting system 38. Preferably, the cleaning system 20 comprises a first operating mode and a second operating mode. The flow diverting system 38 couples the manifold 36 to the intake 26 and the exhaust 28 of the plurality of tubes 22. The displacement system 30 is operable for displacing liquid from the heat exchange system 24 through the manifold 36. Preferably, a plurality of cleaning balls (not shown) are contained in the manifold 36. The cleaning balls are preferably elastomeric balls. However, the cleaning balls may be made of other types of elastic materials. When in the first operating mode, flow of liquid displaced by the displacement system 30 is diverted to transport the plurality of cleaning balls out of the manifold 36 and into the intake 26 of the plurality of tubes 22. As flow of liquid through the plurality of tubes 22 is from the intake 26 towards the exhaust 28, the plurality of cleaning balls introduced into the intake 26 travels through the plurality of tubes 22 for cleaning thereof. The cleaning balls are preferably dimensioned to be smaller than the internal diameter of the plurality of tubes 22. The cleaning balls are preferably shaped for ricocheting off the internal surface of the plurality of tubes while passaging therethrough for dislodging of debris and deposit therefrom and cleaning thereof. Alternatively, the cleaning balls are shaped and dimensioned for interference fitting with the plurality of tubes 22.

Preferably, the cleaning system 20 comprises a trap 42 disposed proximal to where the-flow diverting system 38 couples with the exhaust 28 of the plurality of tubes 22. The trap 42 defines one or more openings (not shown) to enable flow of liquid but shaped and dimensioned to impede passage of the plurality of cleaning balls therethrough. This allows the plurality of cleaning balls exiting the plurality of tubes 22 to be caught by the trap 42 and prevents further transport of the plurality of cleaning balls through the rest of the heat exchange system 24. When in the second operating mode, flow of liquid displaced by the displacement system 30 is re-diverted to draw the plurality of cleaning balls caught by the trap 42 back into the manifold 36.

To enable the plurality of cleaning balls to be introduced into the plurality of tubes 22 for cleaning thereof and to be subsequently retrieved, it is first preferred that the displacement system 30 is operable for drawing liquid into the second port 34 and expelling the drawn liquid out of the first port 32 when in the first operating mode and drawing liquid into the first port 32 and expelling the drawn liquid out of the second port 34 when in the second operating mode. It is further preferred that the manifold 36 defines a first chamber 44 and a second chamber 46 interposed by a separator 48. The separator 48 defines a plurality of apertures (not shown) for fluid communicating the first chamber 44 with the second chamber 46 with each of the plurality of apertures being shaped and dimensioned for impeding passage of the plurality of cleaning balls therethrough.

The flow diverting system 38 is adapted for fluid communicating the first port 32 of the displacement system 30 and the intake 26 to the first chamber 44 of the manifold 36 while substantially impeding fluid communication of the first port 32 and the exhaust 28 with the second chamber 46 and first chamber 44 respectively when in the first operating mode. In the second operating mode, the flow diverting system 38 is further adapted for fluid communicating the first port 32 and the exhaust 28 to the second chamber 46 and first chamber 44 respectively and substantially impeding fluid communication of each of the first port 32 of the displacement system 30 and the intake 26 with the first chamber 44 of the manifold 36.

Preferably, the first chamber 44 of the manifold 36 is shaped and dimensioned for generating a cyclonic vortex flow when liquid is displaced thereinto in the first operating mode. The cyclonic vortex flow is for generating inertia for displacement of the plurality of cleaning balls out of the first chamber 44 and into the intake 26 of the plurality of tubes 22. The manifold 36 may comprise a ball screening unit (not shown) disposed within the first chamber 44. After a period of use, a portion of the plurality of cleaning balls may be worn and reduced below an acceptable size for effective cleaning of the plurality of tubes 22. The ball screening unit defines a plurality of apertures shaped and dimensioned for passaging of a portion of the cleanings balls 40 below the acceptable size therethrough. The cyclonic vortex flow aids in screening and separating of unacceptably-sized portion from acceptably-sized portion of the cleaning balls by the ball screening unit.

Preferably, the flow diverting system 38 comprises a first entry valve 50 inter-coupling the first port 32 of the displacement system 30 and the first chamber 44 of the manifold 36, a first exit valve 52 inter-coupling the first chamber 44 of the manifold 36 and the intake 26 of the heat exchange system 24, a second entry valve 54 inter-coupling the exhaust 28 of the heat exchange system 24 and the first chamber 44 of the manifold 36, and a second exit valve 56 inter-coupling the second chamber 46 of the manifold 36 and the first port 32 of the displacement system 30. Each of the first entry valve 50, the first exit valve 52, the second entry valve 54 and the second exit valve 56 has an open state and a shut state for respectively enabling and substantially impeding liquid flow therethrough.

The first entry valve 50 and the first exit valve 52 are in the open state while the second entry valve 54 and the second exit valve 56 are in the shut state when in the first operating mode, and the first entry valve 50 and the first exit valve 52 are in the shut state while the second entry valve 54 and the second exit valve 56 are in the open state when in the second operating mode. Preferably, each of the first entry valve 50, the first exit valve 52, the second entry valve 54 and the second exit valve 56 is a check-valve. Alternatively, each of the first entry valve 50, the first exit valve 52, the second entry valve 54 and the second exit valve 56 is a solenoid actuated two-way valve.

The flow diverting system 38 is further adapted and operable for fluid communicating the second port 34 of the displacement system 30 to the intake 26 of the heat exchange system 24 when in the first operating mode and for fluid communicating the second port 34 with the exhaust 28 of the heat exchange system 24 when in the second operating mode. Therefore when in the first operating mode, liquid used for displacing the cleaning balls from the manifold 36 to the intake 26 is drawn from the intake 26. Similarly when in the second operating mode, liquid drawn from the exhaust 28 for displacing the cleaning balls back into the manifold 36 is subsequently channelled back to the exhaust 28 of the plurality of tubes 22. The flow diverting system 38 therefore impedes mixing of liquids between the intake 26 and the exhaust 28. As a temperature difference typically exist between liquid at the intake 26 and liquid at the exhaust 28 of the heat exchange system 24, impeding mixing of liquids between the intake 26 and the exhaust 28 through the cleaning system 20 mitigates effects to heat-exchange efficiency of the heat exchange system 24 that is contributed by operating the cleaning system 20 therewith.

Therefore, the cleaning system 20 further comprises a third entry valve 58 inter-coupling the second port 34 of the displacement system 30 and the intake 26 of the heat exchange system 24, and a third exit valve 60 coupling the second port 34 of the displacement system 30 to the exhaust 28 of the heat exchange system 24. Each of the third entry valve 58 and the third exit valve 60 is operable between an open state and a shut state for respectively enabling and substantially impeding liquid flow therethrough.

Figure 4:
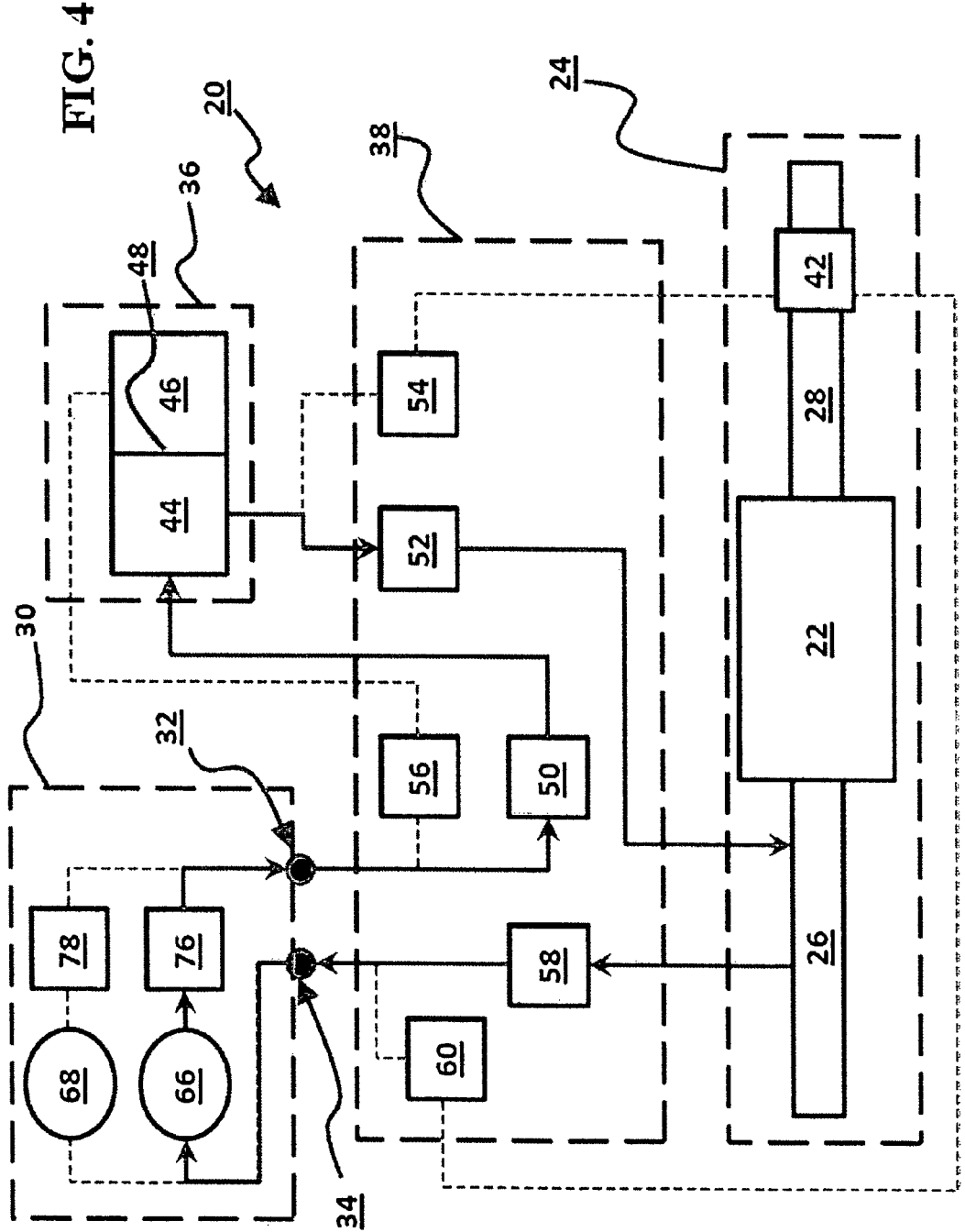
FIG. 4 shows a system flow diagram of the cleaning system of FIG. 1 in a multi-pump configuration and operating in a first operating mode.

The displacement system 30 preferably comprises a bi-directional pump 62 arranged in a single pump configuration with the first port 32 and the second port 34 being defined by the bi-directional pump 62. The bi-directional pump 62 is a centrifugal pump, a positive displacement pump or the like pump adaptable and operable for alternating liquid displacement between two flow directions. Alternatively, the displacement system 30 comprises a first pump 66 and a second pump 68 arranged in a multi-pump configuration with each of the first pump 66 and the second pump 68 being operable for displacing liquid in one flow direction as shown in FIG. 4 and FIG. 5. In the multi-pump configuration, the first port 32 is couplable to an outlet of the first pump 66 and an inlet of the second pump 68. Preferably, operations of the first pump 66 and the second pump 68 is coordinated by a controller (not shown) for alternating between exhaust of liquid by the first pump 66 from the outlet when in the first operating mode and drawing of liquid by the second pump 68 through the inlet 74 when in the second operating mode. Inlet and outlet (not referenced) of respectively the first pump 66 and the second pump 68 are preferably couplable to the second port 34.

When using the multi-pump configuration, the displacement system 30 further comprises a first check-valve 76 inter-coupling the outlet of the first pump 66 and the first port 32 of the displacement system 30, and a second check-valve 78 inter-coupling the inlet 74 of the second pump 68 and the first port 32 of the displacement system 30. The first check-valve 76 is for fluid communicating the outlet of the first pump 66 with the first port 32 and the second check-valve 78 for substantially impeding fluid communication between the inlet 74 of the second pump 68 and the first port 32 when in the first operating mode. In the second operating mode, the first check-valve 76 is for substantially impeding fluid communication between the outlet of the first pump 66 and the first port 32 and the second check-valve 78 for fluid communicating the inlet 74 of the second pump 68 with the first port 32 when in the second operating mode.

In a forgoing manner, a cleaning system is described according to an exemplary embodiment of the invention. Although only one embodiment of the invention is disclosed in this document, it will be apparent to one skilled in the art in view of this disclosure that numerous changes and/or modifications can be made to the disclosed embodiment without departing from the scope and spirit of the invention.

The invention claimed is:

1. A cleaning system for use with a plurality of tubes of a heat exchange system, the heat exchange system having an intake and an exhaust, the cleaning system comprising:
   a displacement system having a first port and a second port, the displacement system being operable for drawing liquid into the second port and expelling the drawn liquid out of the first port when in a first operating mode and drawing liquid into the first port and expelling the drawn liquid out of the second port when in a second operating mode;
   a manifold defining a first chamber and a second chamber, the manifold comprising a separator disposed between the first chamber and the second chamber, the first chamber for receiving at least one cleaning ball, the separator defining at least one aperture for fluid communicating the first chamber with the second chamber and being shaped and dimensioned for substantially impeding passage of the at least one cleaning ball therethrough; and
   a flow diverting system adapted for fluid communicating the first port of the displacement system and the intake to the first chamber of the manifold and substantially impeding fluid communication of the first port and the exhaust with the second chamber and first chamber respectively when in the first operating mode, the flow diverting system being further adapted for fluid communicating the first port and the exhaust to the second chamber and first chamber respectively and substantially impeding fluid communication of each of the first port of the displacement system and the intake with the first chamber of the manifold when in the second operating mode, the at least one cleaning ball being displaced from the first chamber to the intake of the cleaning system for passage through the plurality of tubes when in the first operating mode and the at least one cleaning ball being drawn from the exhaust of the cleaning system into the first chamber when in the second operating mode, wherein the at least one cleaning ball passages through the plurality of tubes for cleaning thereof.

2. The cleaning system as in claim 1, the displacement system comprising:
   a bi-directional pump having the first port and the second port, the bi-directional pump being operable in a first displacement direction for drawing liquid from the second port for discharge from the first port, and in a second displacement direction for drawing liquid through the first port for discharge from the second port.

3. The cleaning system as in claim 1, the displacement system comprising:
   a first pump having an outlet coupled to the first port; and
   a second pump having an inlet coupled to the first port, the first pump and the second pump being operationally inter-configured for discharging fluid from the outlet of the first pump and through the first port when in the first operating mode and drawing fluid into the inlet of the second pump through the first port when in the second operating mode.

4. The cleaning system as in claim 3, the displacement system further comprising a two-way valve operable for fluid communicating the outlet of the first pump with the first port and substantially impeding fluid communication of the inlet of the second pump with the second port when in the first operating mode, and fluid communicating the inlet of the second pump with the first port and substantially impeding fluid communication of the outlet of the first pump with the first port when in the second operating mode.

5. The cleaning system as in claim 3, the displacement system further comprising:
   a first check-valve inter-coupling the second port of the first pump and the first port of the displacement system; and a second check-valve inter-coupling the inlet of the second pump and the first port of the displacement system, the first check-valve for fluid communicating the outlet of the first pump with the first port and the second check-valve for substantially impeding fluid communication between the inlet of the second pump and the first port when in the first operating mode, and the first check-valve for substantially impeding fluid communication between the outlet of the first pump and the first port and the second check-valve for fluid communicating the inlet of the second pump with the first port when in the second operating mode.

6. The cleaning system as in claim 1, the flow diverting system further adapted and operable for fluid communicating the second port of the displacement system to the intake of the heat exchange system when in the first operating mode and fluid communicating the second port with the exhaust of the heat exchange system when in the second operating mode.

7. The cleaning system as in claim 1, the flow diverting system comprising:
   a first entry valve inter-coupling the first port of the displacement system and the first chamber of the manifold;
   a first exit valve inter-coupling the first chamber of the manifold and the intake of the heat exchange system;
   a second entry valve inter-coupling the exhaust of the heat exchange system and the first chamber of the manifold; and
   a second exit valve inter-coupling the second chamber of the manifold and the first port of the displacement system, each of the first entry valve, the first exit valve, the second entry valve and the second exit valve having an open state and a shut state for respectively enabling and substantially impeding liquid flow therethrough.

8. The cleaning system as in claim 7, the first entry valve and the first exit valve are in the open state and the second entry valve and the second exit valve are in the shut state when in the first operating mode, and the first entry valve and the first exit valve are in the shut state and the second entry valve and the second exit valve are in the open state when in the second operating mode.

9. The cleaning system as in claim 7, each of the first entry valve, the first exit valve, the second entry valve and the second exit valve being a check-valve.

10. The cleaning system as in claim 7, the flow diverting system further comprising:
    a third entry valve inter-coupling the second port of the displacement system and the intake of the heat exchange system; and
    a third exit valve coupling the second port of the displacement system to the exhaust of the heat exchange system, each of the third entry valve and the third exit valve being operable between an open state and a shut state for respectively enabling and substantially impeding liquid flow therethrough.

11. The cleaning system as in claim 1, the at least one cleaning ball being at least one elastomeric ball.

12. The cleaning system as in claim 1, the first chamber of the manifold being shaped and dimension for generating a cyclonic vortex flow when liquid is displaced thereinto in the first operating mode, the cyclonic vortex flow for generating inertia for displacement of the at least one cleaning ball out of the first chamber and into the intake of the heat exchange system.

13. The cleaning system as in claim 1, further comprising:
    a trap configured with the exhaust of the heat exchange system for trapping the at least one cleaning ball exiting the plurality of tubes when in the first operating mode, the at least one cleaning ball being retrieved from the trap and into the first chamber of the manifold when in the second operating mode.

* * * * *